United States Patent [19]

Bentsen

[11] Patent Number: 4,999,390

[45] Date of Patent: Mar. 12, 1991

[54] COMPOSITE BOARD AND A METHOD AND A COMPOSITION FOR ITS PRODUCTION

[75] Inventor: Aksel T. Bentsen, Viby J, Denmark

[73] Assignee: Novopan Traeindustri A/S, Ryomgard, Denmark

[21] Appl. No.: 259,114

[22] PCT Filed: Feb. 16, 1988

[86] PCT No.: PCT/DK88/00026

§ 371 Date: Dec. 14, 1988

§ 102(e) Date: Dec. 14, 1988

[87] PCT Pub. No.: WO88/06081

PCT Pub. Date: Aug. 25, 1988

[30] Foreign Application Priority Data

Feb. 16, 1987 [DK] Denmark .................. 772/87

[51] Int. Cl.$^5$ .................. C08J 3/21; C08L 1/26; C08L 75/04
[52] U.S. Cl. .................. 524/30; 524/13; 524/14
[58] Field of Search .................. 524/13, 14, 30

[56] References Cited

U.S. PATENT DOCUMENTS

| | | | |
|---|---|---|---|
| 3,428,592 | 2/1969 | Youker | 524/591 |
| 3,835,081 | 9/1974 | Remley et al. | 524/714 |
| 4,260,532 | 4/1981 | Reuther et al. | 525/424 |
| 4,306,998 | 12/1981 | Wenzel et al. | 428/473 |
| 4,653,177 | 9/1986 | Israel | 528/74.5 |

FOREIGN PATENT DOCUMENTS

| | | |
|---|---|---|
| 1653177 | 11/1970 | Denmark . |
| 2703271 | 8/1978 | Denmark . |
| 2724363 | 11/1978 | Denmark . |
| 2724364 | 12/1978 | Denmark . |
| 1148016 | 4/1969 | United Kingdom . |
| 1523601 | 3/1976 | United Kingdom . |

*Primary Examiner*—Merrell C. Cashion, Jr.
*Assistant Examiner*—Carlos Azpuru
*Attorney, Agent, or Firm*—Birch, Stewart, Kolasch & Birch

[57] ABSTRACT

A composite board comprising organic fibers, particles and/or chips and a binder, the binder being polyisocyanate in an amount of at the most 1.8% by weight. The binder is applied in the form of a cellulose ether or cellulose ether derivative stabilized emulsion.

17 Claims, No Drawings

COMPOSITE BOARD AND A METHOD AND A COMPOSITION FOR ITS PRODUCTION

The present invention relates to a composite board comprising at least one layer made from organic fibres, particles and/or chips and a binder, and a method and an emulsion for producing the same.

Composite boards, that is, boards comprising at least one layer made from organic fibres, particles and/or chips and a binder, such as particle boards, or fibre boards, are made from finely divided organic materials such as straw, wood, bagasse, waste paper, defibrated wood pulp, and the like by spraying of the organic materials with a binder composition at ambient temperature followed by heat pressing in a discontinuous or continuous plate press with heated panels, whereby the binder typically sets in a few minutes. A more detailed description of this technique is found in Helmuth Lampert, *Faserplatten*. VEB Fachbuchverlag 1967, Mitlin, *Particle Board Manufacture*, Press Media Ltd., Kent 1968, and *Taschenbuch der Spanplattentechnik*, 2. Auflage, DRV-Taschenbuch, Deppe/Ernst.

The preferred types of binder have to a great extent been formaldehyde-containing compounds, as these are satisfactory both with respect to their handling and with respect to the strength of the composite boards prepared therewith.

However, in recent years, a disadvantage associated with this type of binder has to an increasing extent been brought into focus: an evaporation of gaseous formaldehyde takes place, both during the preparation of the boards and by slow hydrolysis for months and years after the preparation of the boards.

Therefore, it has been tried to make alternative binders for composite boards which are as effective formaldehyde-containing binders, but which do not emit undesirable gasses. Among these polyurethanes have been found convenient, especially those formed from aromatic isocyanates such as diphenylmethane-4,4'-diisocyanate (MDI).

There is, however, a number of technical problems associated with the use of isocyanate-based binders.

Among these is the difficulty of distributing the binder evenly over the chips, fibres or particles. To use organic solvents for facilitating the distribution is undesirable, both for toxicological reasons and because of the fire hazard.

It has been suggested to improve the handling and distributive properties of the binder by incorporating the isocyanates in emulsions. However, a number of partly mutually conflicting requirements must be fulfilled by such emulsions to obtain suitable and economic production conditions and, at the same time, obtain satisfactory strength properties of the composite boards. Thus, the emulsion must be stable (that is, the emulsion must remain sprayable and must retain its binding capacity substantially undeteriorated) for a sufficient period after its production to permit realistic production conditions, such as, e.g., a period of at least about 4 hours. The emulsion should have a sufficiently low viscosity to secure effective distribution thereof on the fibres, particles or chips before it releases the highly reactive isocyanate. At the same time, the emulsion must be able to effectively deliver highly reactive isocyanate under the conditions which prevail after it has come in contact with the fibres, particles or chips to secure an high binding efficiency.

The above-mentioned problems and requirements may also be the reason why the prior art methods using isocyanate emulsions for composite board production have used the emulsions in relatively high amounts, typically corresponding to at least 4% by weight of isocyanate applied, calculated on the weight of the chips, particles, and/or fibres.

DE-OS 1 653 177 discloses a method for preparing chip boards wherein a solution of isocyanate is applied on the chips from which the boards are made, in a suggested amount of 2–20% by weight, calculated on the dry weight of the chips. No experimental data on the chips board preparation is given.

The present invention provides an effective method and composition for producing composite boards with good strength properties in an economic and efficient manner using a particular type of isocyanate emulsion.

Thus, in one aspect, the invention relates to a method for producing a composite board, comprising subjecting a mixture of organic fibres, particles and/or chips and a binder to compression and heating, the binder being polyisocyanate in the form of a sprayable, substantially stable 20–70% aqueous emulsion, e.g. a 25–60% aqueous emulsion, preferably a 30–50% emulsion, such as an about 40% aqueous emulsion, the emulsion containing a stabilizer which is a water-swellable or water-soluble polysaccharide or polysaccharide derivative.

Although it is not intended to limit the invention to any theory, it is assumed that the polysaccharide of polysaccharide derivatives act as dispersing agents on the one hand whereby they physically stabilize the isocyanate emulsion against phase separation, and on the other hand stabilize the isocyanate chemically against undesired hydrolysis.

Preferably, the stabilizer is present in the emulsion in an amount of 0.1–10% by weight, e.g. 0.1–5%, more specifically 0.2–2%, in particular 0.5–1.5%, calculated on the water phase of the emulsion.

The stabilizer may be a cellulose derivative and is preferably a non-ionic cellulose ether or cellulose ether derivative with an average molecular weight between 10,000 and 1,000,000. With higher molecular weights, it may be difficult to effectively distribute the emulsion on the chips, particles and/or fibres without using special high pressure spraying equipment, and with lower molecular weights, un-economically large amounts of the cellulose ether may be necessary to obtain the desired dispersing effect. It is especially preferred that the average molecular weight is in the range between 25,000 and 300,000.

The water-soluble or water-swellable character of the cellulose ethers or cellulose ether derivatives is dependent on the presence of suitable substituents on the cellulose ethers or their derivatives. Normally, at least one such substituent, such as, e.g., $-CH_2-COO^-Na^+$, $-CH_3$, $-CH_2CH_3$, must be present per anhydroglucose unit.

It is preferred that the non-ionic cellulose ether or cellulose ether derivative has at least one lipophilic substituent per anhydroglucose unit. The lipophilic substituent, such as, e.g., $-CH_3$ and $-CH_2CH_3$, is presumed to serve to establish some sort of binding between the cellulose ether and the polyisocyanate droplet, the lipophilic group being attracted by the lipophilic polyisocyanate, the cellulose ether thereby forming a sort of protective film over the polyisocyanate droplets to prevent reaction with water and fusion of the droplets.

The preferred cellulose ethers are ethylhydroxyethyl celluloses (HEEC), which results in an emulsion with excellent sprayability and long pot-life.

Another very suitable type of cellulose ethers is constituted by hydroxypropyl celluloses (HPC). Among the tested cellulose ethers, hydroxypropyl cellulose seems to impart the longest most efficient pot-life for the isocyanate emulsion in the lowest concentration.

Other cellulose ethers which may be used are methyl cellulose (MC), and mixed ethers thereof such as hydroxypropylmethyl cellulose (HPMC) or hydroxyethylmethyl cellulose (HEMC).

The stabilizer may also be a ionic cellulose ether such as carboxymethyl cellulose (CMC). Although CMC has no lipophilic substituent and thus no surface-active properties with respect to the above-mentioned theory, it is believed that CMC is active due to its macromolecular structure which makes adsorption of insoluble particles possible, and thereby stabilizes the solution (this principle is the same as the one employed in CMC-containing detergents where CMC adsorbs the dirt particles).

The isocyanates which may be used are not critical. Thus, in principle, any of the isocyanates discussed in DE OS 26 10 552 may be used. However, it is preferred to use diphenylmethane diisocyanate commercialized under the designation MDI as well as polymerization products thereof. Such isocyanates may be prepared by analine/formaldehyde condensation followed by phosgenation (whereby "crude MDI" is produced).

The emulsion is preferably produced using vigorous agitation and is preferably agitated immediately prior to application. Experience from production tests has shown that the finer the emulsion is, the better is its stability. The ideal emulsion is a homogeneous fine emulsion with a light colour and without any phase separation, but in practice, some phase separation may be acceptable as long as agitation in connection with the application will result in the re-establishment of an effectively distributable emulsion which retains the reactivity of the isocyanate.

The concentration of isocyanate in the emulsion is normally in the range of 5-70% by weight, e.g. 10-60% or 15-55% by weight, such as 20≧50% by weight, especially 25-50% by weight, and preferably 25-40% by weight. When the isocyanate concentration of the emulsion is very low, the vapour pressure of the water (contained in the emulsion) which is present in the particle board is so high that the board might rupture at the release of the pressure. Therefore, at low isocyanate concentrations the compression is suitably performed under vacuum. When the concentration of isocyanate exceeds 40% by weight, the viscosity may be too high for certain application equipment.

The emulsion is suitably applied in an amount corresponding to an applied amount of isocyanate 1-7% by weight, e.g. 1-5%, such as 1-3%, in particular 1-2% by weight. The higher values of 3-7% are normally used for preparing special moisture-resistant boards. In a particular aspect, the isocyanate is applied an amount of at the most 1.8% by weight, calculated on the weight of the dry particles or chips of the layer. It was surprising that it is possible to produce chipboards with fully acceptable strength for many purposes by using such a low amount of isocyanate binder, and hence, one aspect of the invention relates quite generally to a composite board comprising at least one layer made from organic fibres, particles and/or chips and a binder, the binder being polyurethane in an amount of at the most 1.8% by weight, preferably 1.2-1.5% by weight, such as 1.4%, calculated on the weight of the layer. This aspect of the invention is believed to be generally novel, irrespective of the identity of any stabilizer used in the preparation of the isocyanate emulsion The stabilized isocyanate emulsion of the invention is in general more sticky than conventional isocyanate emulsion. Thus, when applying the stabilized emulsion of the invention to chips, particles and/or fibres, the emulsion will in most cases immediately subsequent to application exert an adhesive effect without the need for any heat treatment. This cold adhesive effect is very advantageous in the handling of the boards prior to the heat pressing treatment as the chips, particles and/or fibres are substantially glued together during the handing of the boards prior to heat pressing, e.g. during the transportation to the heat pressing equipment. The cold adhesive effect is normally not observed when using conventional isocyanate emulsions, and the preparation of chip boards wherein these conventional isocyanate emulsions are employed may consequently be made difficult, as it is difficult to maintain sufficient cohesion of the chips prior to the heat pressing of the boards in which the adhesiveness of the isocyanate emulsion is activated.

In the process of the invention, the water content in the chips, particles and/or fibres used for the production is often about 10% by weight when the chips, particles, and/or fibres are introduced. If desired, these materials may be dried before the isocyanate emulsion is applied. In a preferred aspect, the material used for the production is constituted predominantly or exclusively by wood chips.

Preferably, the heat compression of the chips, particles and/or fibres and the binder to make the boards of the present invention takes place at a temperature from 150° to 230° C., more preferably at 160° to 220° C., e.g. 180° to 210° C.

In order to reduce swelling of the produced plates, a wax emulsion may be added, typically in an amount of a few percent by weight, such as 1-2% by weight, of a aqueous wax emulsion having a wax concentration of about 30-70% by weight, such as about 50% by weight. The wax emulsion is applied to the chips, particles and/or fibres substantially simultaneously with the isocyanate emulsion, but from a different spraying nozzle. It is preferred to agitate the wax emulsion before it is applied.

The process according to the invention and the usefulness of the emulsions of the invention in the preparation of composite boards are further illustrated by the examples which follow.

The chemicals used in the examples are stated in Table 1:

TABLE 1

| Abbreviation | Chemical designation | Molecular weight | Concentr. in aqueous solution | Trade mark | Commercialized by |
|---|---|---|---|---|---|
| HEEC | Ethylhydroxy- | 10.000 | 2% | Bermocoll E230G | Berol Kemi |

TABLE 1-continued

| Abbreviation | Chemical designation | Molecular weight | Concentr. in aqueous solution | Trade mark | Commercialized by |
|---|---|---|---|---|---|
| | ethylcellulose | 100.000 | 1% | Bermocoll E320G | Berol Kemi |
| HPC | Hydroxypropylcellulose | 300.000 | 1% | Klucel M | Hercules Inc. |
| | | 100.000 | 4% | Klucel J | Hercules Inc. |
| MC | Methylcellulose | | 2% | Methocel A4C | Dow Chemical |
| | | | 2% | Methocel A15 | Dow Chemical |
| | | | 1% | Methocel A15C | Dow Chemical |
| HPMC | Hydroxypropylmethylcellulose | | 1% | Methocel 35MS | Dow Chemical |
| CMC | Carboxymethylcellulose | | 0.7% | Palsgaard 7409 | Palsgaard |
| | | | 1.7% | Blanose refined CMC 7MC | Hercules Inc. |
| HEC | Hydroxyethylcellulose | | | Natrosol 250HHR | Hercules Inc. |
| | | | 0.5% | Natrosol 250MR | Hercules Inc. |
| | | | 1% | Natrosol 250GR | Hercules Inc. |
| PVAL | Polyvinyl alcohol | | 10% | Mowiol 4-98 | Hoechst |
| | | | 10% | Mowiol 04-MI | Hoechst |
| | | | 5% | Mowiol 28-99 | Hoechst |
| | | | 5% | Mowiol 26-88 | Hoechst |
| MDI | Diphenyl methane diisocyanate | | | Desmodur ® DIW681 VP PV 1520/A31 | Bayer Bayer |
| | Wax | | 65% | Mobilcer RV | Mobil |
| | Polyvinyl pyrrolidone | | | Luviskol K90 | BASF |

In the following examples, the experiments regarding resistance to moisture were performed in accordance with DIN standards V20, V70 and V100 which is in accordance with DIN 68761. These standards are graded according to water resistance and state a maximum swelling in thickness in accordance with standardized conditions during prolonged immersion in water at 20° C., 70° C. and 100° C., respectively.

EXAMPLE 1

The suitability of various cellulose ethers as dispersing agents for a solution containing 40% of isocyanate, MDI (Desmodur ® DIW 681) and 60% of an aqueous cellulose ether solution was evaluated on the basis of the spraying (atomization) properties, visual appearance (fineness of the emulsion, separation or not), and pot life (the time the emulsion remains sprayable and retains the reactivity of the isocyanate with respect to forming polyurethane on contact with wood chips in the production of a composite board).

The atomization properties were examined in a spray test with emulsions containing the cellulose ether in question. The concentration of the cellulose ether in aqueous solution used in the tests is as stated.

The MDI used in the test was the one commercialized by Bayer under the designation "Decmodur ® DIW 681". The optimum appearance of the emulsion is a fine, light emulsion which does not separate and does not generate bubbles.

The results are stated in table 2. It can be seen that both the nonionic cellulose ethers. HEEC, HPC and HPMC, as well as the ionic cellulose ether. CMC provide an emulsion with satisfactory visual appearance, atomization properties, and potlife. This is in contrast to the hydroxyethyl celluloses (HEC) (which do not contain lipophilic substituents) and generally do not provide the necessary stability of the emulsion.

The comparison purposes, polyvinyl alcohol (PVAL) and polyvinyl pyrrolidone have been used as dispersing agents. It can be seen that the use of PVAL in high concentrations (5% and 10%) results in an emulsion with good atomization properties and visual appearance, but with a rather short potlife. The use of polyvinyl pyrrolidone in a concentration of 4% results in an emulsion with tolerable atomization properties, but the emulsion separates.

TABLE 2

| Dispersing agent | Atomization properties | Visual appearance | Pot life at 22° C. usable for |
|---|---|---|---|
| HEEC E230G | OK | fine, light | 9.5 hours |
| HEEC E320G | good, OK in 1% | light | 9 hours |
| HPC (J) | OK | light | 26 hours |
| HPC (M) | tolerable, OK in 0.67% | light | 24 hours |
| MC (A15) | OK in 3% | almost light | 8 hours |
| MC (A4C) | OK in 1.5% | light, homogeneous | 8 hours |
| MC (A15C) | OK in 1% | medium brown | unstable, separates |
| HPMC | tolerable in 1%, OK in 0.5% | almost light, separates 0.5 cm | 5 hours |
| HEC 250 HHR | no spray | dark, separates | 5 hours |
| HEC 250 MR | tolerable, OK in 0.5% | dark, separates | 6 hours |
| HEC 250 GR | fine, OK in 1% | almost light, separates 0.5 cm | 5 hours |
| CMC (7MC) Palsgaard | excellent in 1.7% OK in 0.7% | light, homogeneous OK | 12 hours 4 hours |
| PVAL | | | |
| 4-98 | OK in 10% | light | 4 hours |
| 04-MI | | | |
| 28-99 | OK in 5% | light | 2 hours |

TABLE 2-continued

| Dispersing agent | Atomization properties | Visual appearance | Pot life at 22° C. usable for |
|---|---|---|---|
| 26-88 Polyvinyl pyrrolidone | OK in 5% tolerable in 4% | light separates | 2 hours 6 hours |

EXAMPLE 2

In a rotating drum, 1630 g dried wood chips (2-3% of moisture) were sprayed by means of an airless spray in a rotating drum with 3% of a mixture prepared as follows:

40% of MDI polymerisate ("Desmodur® DIW 681") was dispersed by means of a Cowles dissolver (laboratory model, 1800 rpm) in 60% of a 2% aqueous solution of "Bermocoll E230 G". This solution was prepared in the dissolver the day before.

The resulting concentration of isocyanate applied to the chips was thus 1.2% by weight. The chips were formed to a mat of 40×40 cm and were pressed between separation blocks of 15 mm for 4.5 minutes at a pressure of 80 metric tons which was relieved to 10 metric tons for another 4.5 minutes. The temperature of the planes was 160° C., maintained by steam heating.

The finished board has a bending strength of 25 MPs and tensile strength of 0.6 MPa, both according to the standard SIS 235111, and 40% swelling at 20° C. for 24 hours.

EXAMPLE 3

The experiment described in Example 2 was repeated in a corresponding press, but with electrical heating. In order to reduce swelling, the chips had previously been sprayed with 1% of wax as a 50% wax emulsion (2% "Mobilcer RV"). The resulting board had the same strength properties as the board prepared in Example 2. The swelling after 24 hours' water storage at 20° C. was 18%.

EXAMPLE 4

In the electrical press used in Example 3, a number of tests were carried out to prepare chipboards of a thickness in the range of 11.0 mm to 12.8 mm using binder emulsions made with saccharides (cellulose) derivatives and other stabilizers, respectively. The concentration of the respective stabilizers in aqueous solution is stated in Table 3 under "Type of Stab.". The strength measurements mentioned in Example 2 were performed.

The standing time from the preparation of the emulsions to the preparation of the chipboards was up to 4 hours except for Test No. 27 in which it was 6.75 hours. Some of the variations observed, especially in the bending strength values, must be ascribed to differences in the chips used, especially as regards chips length.

The general experimental conditions under which the experiments were performed were as follows: the binder, composed of 40% of a solution of MDI and 60% of a solution of stabilizer, was applied in a concentration of 2.5-4.5%, calculated on the dry chips. The isocyanate was generally of the Desmodur® DIW681 type. The resulting concentration of isocyanate applied to the chip boards is state in Table 3.

The chip boards were prepared by applying a pressure of 90 tons for 4 minutes followed by a pressure of 10 tons for 4 minutes, all at a temperature of 165° C.

The wax emulsion is applied to a concentration of 2% in some of the tests.

Exceptions to the above mentioned experimental conditions are note in Table 3 under comments.

TABLE 3

| | Binder | | Board | | | % Swelling after | | |
|---|---|---|---|---|---|---|---|---|
| Test No. | Type of Stab. | Conc. of MDI | Spec. weight kg/m³ | Bending MPa | Tensile MPa | 2 h | 24 h | Comments |
| 1 | HEEC | 1.4 | 755 | 19.2 | 0.96 | 24 | 37 | |
| 2 | E230 G | 1.2 | 744 | 16.3 | 0.70 | | | |
| 3 | 2% | 1.0 | 743 | 13.7 | 0.61 | | | |
| 4 | | 1.2 | 744 | 15.9 | 0.53 | 8 | 34 | +2% wax |
| 5 | HEEC | 1.2 | 725 | 22.2 | 0.63 | 24 | 41 | |
| 6 | E320 G 1% | 1.6 | 740 | 22.1 | 0.58 | 7 | 28 | +2% wax |
| 7 | HEEC | 1.4 | 757 | 23.0 | 0.83 | 24 | 39 | |
| 8 | E320 G | 1.2 | 745 | 21.2 | 0.68 | | | |
| 9 | 1.2% | 1.0 | 762 | 19.0 | 0.58 | | | |
| 10 | | 1.2 | 738 | 16.8 | 0.40 | 10 | 33 | +2% wax |
| 11 | HEEC E230 G | 1.2 | 746 | 23.0 | 0.60 | 38 | 48 | MDI is VP PV |
| 12 | 2% | 1.2 | 756 | 22.8 | 0.68 | 10 | 29 | as above, +2% wax |
| 13 | MC (A4C) | 1.4 | 752 | 21.7 | 0.76 | 25 | 42 | |
| 14 | 1.5% | 1.2 | 746 | 15.3 | 0.65 | | | |
| 15 | | 1.0 | 740 | 11.1 | 0.56 | | | |
| 16 | | 1.2 | 750 | 17.0 | 0.53 | 9 | 39 | +2% wax |
| 17 | MC (A15) | 1.4 | 753 | 19.7 | 0.93 | 29 | 40 | |
| 18 | 3% | 1.2 | 726 | 14.8 | 0.75 | | | |
| 19 | | 1.0 | 740 | 10.0 | 0.61 | | | |
| 20 | | 1.2 | 731 | 13.9 | 0.57 | 8 | 37 | +2% wax |
| 21 | HPMC 1% | 1.35 | 694 | 20.8 | 0.78 | 31 | 51 | 30% MDI/ 70% HPMC |
| 22 | | 1.2 | 737 | 19.6 | 0.66 | | | as above |
| 23 | | 1.05 | 739 | 17.6 | 0.57 | | | as above |
| 24 | | 1.2 | 736 | 17.5 | 0.64 | 13 | 50 | +2% wax, as above |
| 25 | HPC (M) | 1.4 | 760 | 19.2 | 0.92 | 23 | 37 | |
| 26 | 1% | 1.2 | 734 | 14.5 | 0.68 | | | |
| 27 | | 1.0 | 738 | 11.2 | 0.60 | | | |

TABLE 3-continued

| | Binder | | Board | | | | | |
|---|---|---|---|---|---|---|---|---|
| | Type | | Spec. | Strength | | % Swelling | | |
| Test | of | Conc. | weight | Bending | Tensile | after | | |
| No. | Stab. | of MDI | kg/m³ | MPa | MPa | 2 h | 24 h | Comments |
| 28 | | 1.2 | 744 | 13.5 | 0.57 | 8 | 35 | +2% wax |
| 29 | HPC (M) 0.67% | 1.4 | 744 | 16.8 | 0.80 | 34 | 41 | stored for 6.75 hours |
| 30 | HPC (J) | 1.4 | 718 | 18.4 | 0.78 | 29 | 51 | |
| 31 | 4% | 1.2 | 731 | 17.6 | 0.65 | | | |
| 32 | | 1.0 | 734 | 16.7 | 0.46 | | | |
| 33 | HEC | 1.4 | 736 | 17.2 | 0.67 | | | |
| 34 | (GR 250) | 1.2 | 742 | 15.8 | 0.64 | | | |
| 35 | | 1.0 | 734 | 12.1 | 0.53 | | | |
| 36 | | 1.2 | 736 | 13.6 | 0.52 | | | +2 wax |
| 37 | PVAL (4-98) 10% | 1.2 | 734 | 18.4 | 0.59 | 38 | 51 | |
| 38 | PVAL | 1.2 | 742 | 14.2 | 0.31 | | | |
| 39 | (26-88) 5% | 1.6 | 735 | 19.4 | 0.47 | | | |
| 40 | CMC(7MC) 1.7% | 1.2 | 744 | 22.6 | 0.64 | 32 | 47 | |
| 41 | polyvin-ylpyrro-lidone | 4.0 | 758 | 31.9 | 1.00 | 10 | 18 | |
| 42 | | 1.2 | 727 | 17.8 | 0.44 | 34 | 41 | |
| 43 | | 1.2 | 733 | 17.8 | 0.47 | 32 | 41 | 50% MDI/ 50% poly-vinyl pyrrolidone 4% in water |

I claim:

1. A composite board comprising at least one layer made from organic fibers, particles and/or chips and a binder composition, the binder composition being polyisocyanate in the form of a sprayable substantially stable 20–70% aqueous emulsion containing a stabilizer which is a cellulose ether or cellulose ether derivative, the polyisocyate being present in an amount of at the most 1.8%, based on the dry weight of the organic fiberes, particles and/or chips.

2. A method for producing a composite board comprising at least one layer made from organic fibers, particles and/or chips, comprising subjecting a mixture of organic fibers, particles and/or chips and a binder composition to compression and heating, the binder composition being polyisocyanate in the form of sprayable, substantially stable 20–70% aqueous emulsion containing a stabilizer which is a cellulose derivative cellulose ether or cellulose ether derivative, the polyisocyanate being present in an amount of at the most 1.8%, based on the dry weight of the organic fibers, particles and/or chips.

3. A method according to claim 2 wherein the polyisocyanate is present in an amount in the range of 1.2–1.5%, based on the dry weight of the organic fibres, particles and/or chips.

4. A method according to claim 3 wherein the polyisocyanate is present in an amount of about 1.4%, based on the dry weight of the organic fibres, particles and/or chips.

5. A method according to claim 2 wherein the polyisocyanate is diphenylmethane-4,4'-diisocyanate (MDI).

6. A method according to claim 2 wherein the cellulose derivative contains at least one lipophilic substituent per anhydroglucose unit.

7. A method according to claim 2 wherein the cellulose derivative is selected from carboxymethylcellulose, hydroxypropylcellulose, and ethylhydroxyethylcellulose and mixed ethers thereof.

8. A method according to claim 2 wherein the concentration of the emulsion is 30–50% by weight.

9. A method according to claim 2 wherein the stabilizer is present in the emulsion in an amount of 0.1–10% by weight, based on the weight of the water phase of the emulsion.

10. A method according to claim 9 wherein the stabilizer is present in the emulsion in an amount of 0.1–5% by weight, based on the weight of the water phase of the emulsion.

11. A method according to claim 10 wherein the stabilizer is present in the emulsion in an amount of 0.2–2% by weight, based on the weight of the water phase of the emulsion.

12. A method according to claim 11 wherein the stabilizer is present in the emulsion in an amount of 0.5–1.5% by weight, based on the weight of the water phase of the emulsion.

13. A method according to claim 2 wherein the binder composition is applied to the organic fibres, particles and/or chips so as to obtain a substantially coherent structure which is subsequently subjected to the heating and compression.

14. A method according to claim 2 wherein the best compression is performed at 150°–230° C.

15. A method according to claim 14 wherein the heat compression is performed at 160°–220° C.

16. A method according to claim 15 wherein the heat compression is performed 180°–210° C.

17. A method according to claim 2 wherein the composite board is made from wood chips.

* * * * *

UNITED STATES PATENT AND TRADEMARK OFFICE
CERTIFICATE OF CORRECTION

PATENT NO. : 4,999,390
DATED : March 12, 1991
INVENTOR(S) : Aksel T. Bentsen

It is certified that error appears in the above-identified patent and that said Letters Patent is hereby corrected as shown below:

Col. 9, Claim 2, Lines 49-50;

Please change "which is a cellulose derivative cellulose ether" to --which is a cellulose ether--.

Col. 10, Claim 14, Lines 58-59;

Please change the term "best compression" to --heat compression--.

Signed and Sealed this

Twenty-second Day of December, 1992

Attest:

DOUGLAS B. COMER

Attesting Officer   Acting Commissioner of Patents and Trademarks